UNITED STATES PATENT OFFICE.

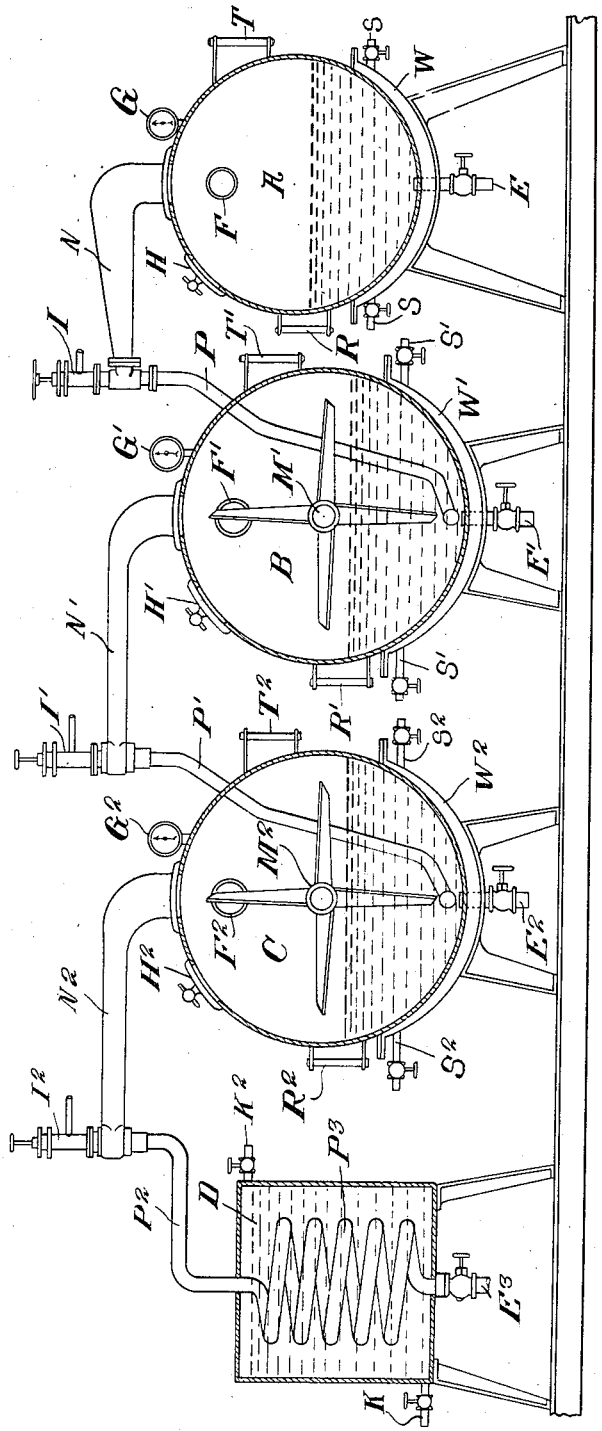

CARL WALTER VOLNEY, DECEASED, LATE OF KEYPORT, NEW JERSEY, BY SARAH LOUISE G. VOLNEY, EXECUTRIX, OF KEYPORT, NEW JERSEY.

MANUFACTURE OF ACETATE OF LIME AND WOOD-ALCOHOL.

1,052,446.

Specification of Letters Patent.

Patented Feb. 4, 1913.

Application filed March 2, 1911. Serial No. 611,909.

*To all whom it may concern:*

Be it known that CARL WALTER VOLNEY, deceased, late a citizen of the United States, residing at Keyport, in the county of Monmouth and State of New Jersey, invented certain new and useful Improvements in the Manufacture of Acetate of Lime and Wood-Alcohol, of which the following is a specification.

This present improvement presents a method by which in one operation a comparatively pure acetate of lime and a comparatively pure wood alcohol can be produced in an extremely simple and economical manner.

By the present method which is hereinafter described, the difficulties and inconveniences heretofore experienced in using calcium carbonate are overcome, the resinous matters and other impurities are removed from the calcium acetate solution and the formation of calcium bicarbonate is avoided, thus producing by a single operation a comparatively pure salt of calcium acetate.

In carrying out this invention vapor of pyroligneous acid will be passed through calcium carbonate held in suspension in a suitable liquid. In practice it has been found desirable to conduct and force the vapor of crude pyroligneous acid into boiling water, which holds in suspension pulverized calcium carbonate. The liquid will preferably be kept at or near the boiling point during the entire operation and the pulverized calcium carbonate be kept in contact with the pyroligneous acid gases by means of constant agitation. Acetic acid thus readily decomposes the calcium carbonate. Such decomposition is effected without the formation of calcium bicarbonate and without foaming. The carbonic acid gas developed during the decomposition of the carbonate assists in carrying off the fatty acids, phenolic bodies, resinous matters and other impurities which latter under these conditions do not decompose the calcium carbonate. The vapors from the above described step of the process will be presented to a mixture of slaked or caustic lime. The vapors from the calcium carbonate reaction which are practically free from acetic acid, are preferably continuously removed from the vessel by partial vacuum and are conveyed into a second system of receivers containing a mixture of slaked or caustic lime and hot water which is kept constantly agitated. It is advisable that an excess of slaked or caustic lime be present during the entire operation. The fatty acids, phenolic bodies, resinous matters and other impurities are thus saponified and retained in the receiver. The vapors which escape from this step of the process carry with them indifferent volatile bodies, principally wood alcohol, and are conveyed into a condensing apparatus suitable for the recovery of wood alcohol. For the economical and successful carrying out of this process it is necessary that the arrangement of the apparatus should be such as to prevent the impurities from reacting on the calcium carbonate and to facilitate their removal from the receiver containing the calcium carbonate. This can readily be accomplished by the use of aspirators or injectors so arranged as to draw off the gases from each receiver and force it on into the next one.

The accompanying drawing indicates in a diagrammatic way apparatus which may be successfully employed in carrying out this process.

A is a retort containing crude pyroligneous acid; W, a water or steam jacket; T, a thermometer; F, a feed pipe for the liquid; H, a hand-hole-plate; G, a pressure gage; S, steam pipes for steam jacket; E, an exit pipe for withdrawing the liquid; R, a liquid gage, and N the nose for carrying off the resultant vapors.

B, is a receiver for the calcium carbonate and water; W', a water or steam jacket; T', a thermometer; G', a pressure gage; S', steam pipes for steam jacket; F', a feed pipe for the introduction of water or the mixture of water and calcium carbonate; H', a hand-hole-plate; E', an exit pipe for withdrawing the liquid; R', a liquid gage; M', mixing or agitating mechanism; N', a nose for carrying off the resultant gases and I an injector for passing the gases from nose N to the pipe P which leads into the receiver B.

C is a receiver for the caustic lime or slaked lime and water; $W^2$ a water or steam jacket; $T^2$, a thermometer; $H^2$, a hand-hole-plate; $F^2$, a feed pipe for the introduction of water or the lime compound and water; $G^2$ a pressure gage; $R^2$, a liquid gage; $E^2$, an exit pipe for the drawing off of the liquid; $M^2$, an agitating or mixing mechanism; S² steam pipes for steam jacket; N² nose for the carrying off of the resultant gases, and I² an injector for passing the gases from the nose N' to the pipe P' and thence into the receiver C.

D, is an ordinary condenser for the condensation of the gases from C, in the worm P³; E³, exit pipe; K and K² pipes for the cooling liquid in the condensers. The gases for condensation will be passed from the nose N² by the injector I² into pipe P² and from thence to the worm P³.

In carrying out this process by use of the apparatus described, it has been found practicable to place crude pyroligneous acid in the receiver A, heat by means of the steam jacket, and pass the resultant gases through the pipe P, into the receiver B, containing the calcium carbonate and water. The temperature of this mixture is preferably kept at the boiling point and is constantly agitated. The gases from the receiver B, pass through the pipe P', into the receiver C, containing calcium hydroxid and water. This mixture is heated by means of the steam jacket and the resultant vapors are passed through the pipe P², into the condenser D. The passage of these gases is facilitated by means of the injectors, which are so regulated as to form a continuous passage of the gases. The amount of vacuum and pressure depends upon the size and formation of the particular apparatus, the pressure usually not greatly exceeding that of the atmosphere. The solution of calcium acetate in the receiver B is tested from time to time and when properly concentrated is drawn off through the exit pipe E' and evaporated. The solution of phenolic and other impurities in the receiver C is drawn off as necessary through the exit pipe E². The wood alcohol is recovered from the condenser D' by means of the exit pipe E³.

What is claimed as the invention is:

1. The process of manufacturing acetate of lime which consists in presenting pyroligneous acid vapors to hot calcium carbonate in the presence of water.

2. The process of manufacturing acetate of lime which consists in passing hot pyroligneous acid vapors through finely subdivided calcium carbonate suspended in hot water.

3. The process of manufacturing acetate of lime and removing the impurities which consists in passing pyroligneous acid vapors through calcium carbonate suspended in water and passing the vapors arising from out of such water through calcium hydrate and water.

4. The process of manufacturing acetate of lime and wood alcohol which consists in passing pyroligneous acid vapors through calcium carbonate suspended in water, passing the vapors arising from out of such water through calcium hydrate in water and passing the vapors and gases arising from the calcium hydrate through a condenser.

5. The process of manufacturing acetate of lime and wood alcohol which consists in passing pyroligneous acid vapors through calcium carbonate suspended in hot water, passing the vapors arising from out of such water through hot calcium hydrate and passing the gases and vapors arising from the calcium hydrate through a condenser.

6. The herein described process which consists in vaporizing pyroligneous acid and passing the same by means of an injector into a receiver containing calcium carbonate suspended in water, passing the vapors from such receiver by means of an injector into a receiver containing slaked lime and water and passing the vapors arising from such last named receiver through a condenser.

7. The herein described process which consists in vaporizing pyroligneous acid and passing the same while hot by means of an injector into a receiver containing calcium carbonate suspended in hot water, passing the vapors from such receiver by means of an injector into a receiver containing slaked lime and hot water and passing the vapors arising from such last named receiver through a condenser.

SARAH LOUISE G. VOLNEY,
*Executrix of the late Carl W. Volney, deceased.*

Witnesses:
   ISADORE BERNSTEIN,
   HARRY C. HEBIG.